United States Patent
Herbst et al.

(10) Patent No.: US 8,014,980 B2
(45) Date of Patent: Sep. 6, 2011

(54) METHOD FOR SIMULATING DEVIATIONS IN SURFACE APPEARANCE OF PLASTICS PARTS

(75) Inventors: Harald Herbst, Linz (AT); Anton Sageder, Linz (AT); Thomas Rothmayer, Linz (AT); Christof Wurnitsch, Neufelden (AT); Rudolf Woelfer, Linz (AT)

(73) Assignee: Borealis Technology Oy, Porvoo (FI)

( * ) Notice: Subject to any disclaimer, the term of this patent is extended or adjusted under 35 U.S.C. 154(b) by 613 days.

(21) Appl. No.: 11/988,065

(22) PCT Filed: Jun. 23, 2006

(86) PCT No.: PCT/EP2006/006060
§ 371 (c)(1),
(2), (4) Date: Mar. 27, 2008

(87) PCT Pub. No.: WO2007/000284
PCT Pub. Date: Jan. 4, 2007

(65) Prior Publication Data
US 2009/0132212 A1    May 21, 2009

(30) Foreign Application Priority Data
Jun. 29, 2005  (EP) .................................. 05105826

(51) Int. Cl.
*G06F 17/10*    (2006.01)
*G06G 7/48*    (2006.01)

(52) U.S. Cl. ................................................. 703/2; 703/9
(58) Field of Classification Search .................. 703/1, 2, 703/6, 9
See application file for complete search history.

(56) References Cited

U.S. PATENT DOCUMENTS

| 6,096,088 | A * | 8/2000 | Yu et al. ............................. 703/9 |
| 2004/0230411 | A1* | 11/2004 | Zheng et al. ........................ 703/6 |
| 2005/0114104 | A1* | 5/2005 | Friedl et al. ........................ 703/2 |

FOREIGN PATENT DOCUMENTS

| EP | 1 218 163 | 7/2002 |
| EP | 1 385 103 | 1/2004 |
| JP | 4-331125 | 11/1992 |
| WO | WO-02/03309 | 1/2002 |

OTHER PUBLICATIONS

Carlson et al. "Modeling of Reoxidation Inclusion Formation During Filling of Steel Castings", Jun. 2004, University of Iowa, pp. 1-26.*
A. Grillet, et al.; "Numerical Analysis of Flow Mark Surface Defects in Injection Molding Flow"; Journal of Rheology AIP for Soc. Rheology USA, [Online], vol. 46, No. 3, May 2002, pp. 651-669.

(Continued)

*Primary Examiner* — Kamini S Shah
*Assistant Examiner* — Hung Havan
(74) *Attorney, Agent, or Firm* — Jordan and Hamburg LLP

(57) ABSTRACT

A forming process of plastic parts is simulated. The position and time of plastics particles which exceed at least one defined critical limit are detected. The final positions of particles in the surface layer of the plastics part are computed. The positions of the particles in the surface layer are defined as positions with deviations in the surface appearance.

14 Claims, 5 Drawing Sheets

OTHER PUBLICATIONS

R. C. Atwood, et al.; "Modeling the Surface Contamination of Dental Titanium Investment Castings"; Dental Materials, Elsevier, vol. 21, No. 2, Feb. 2005, pp. 178-186.

Jianxin Guo, et al.; "Numerical Simulation of Injection Molding of Semicrystalline Thermoplastics"; Antec, Plastic the Lone Star, vol. 1, 2001, pp. 1-5.

Fluent: "Viscoelasticity"; Fluent Home Page, [Online], Oct. 25, 2004, pp. 1-6.

R. M. Sievers, et al.; "Simulating the Polypropylene Filling of a Dispensing Closure Mold With Injection Molding Software"; Americal Society for Engineering Education, 2005 IL/IN Sectional Conference, [Online], Apr. 1, 2005, pp. 1-6.

Apr. 20, 2005 Sigmasoft User Manual pp. 7-9.

Nov. 4-6, 2004 Modeling of Reoxidation Inclusion Formation During Filling of Steel Castings Kent D. Carlson et al. pp. 1-26.

Nov. 2000 Simulation beim Spritzgiessen von EPDM Georg Hohl et al. KU Kunststoffe vol. 90 pp. 106-111.

May 19, 2010, Webpage (http://www.parker.com.tw/e/tradeshow.htm) Trade Shows of parker Plastic Machinery Co., Ltd., pp. 1-11.

Oct. 20, 2004 Webpage (http://www.processingtalk.com/news/rap/rap/rap111.html) Rapra seeks partners on a major Exhibit at K 2004: News from Smithers Rapra Smithers Rapra Processingtalk—Process Engineering pp. 1-2.

Mar. 16, 2004 Webpage (http://www.osti.gov/bridge/product.biblio.jsp?osti_id=838855) printout—"Yield Improvement and Degect Reduction in Steel Casting" Kent Carlson et al. Information Bridge: DOE Scientific and Technical Information—Document #838855.

Nov. 4-6, 2004 Time programme for National T&O Conference.

* cited by examiner

METHOD FOR SIMULATING DEVIATIONS IN SURFACE APPEARANCE OF PLASTICS PARTS

BACKGROUND OF THE INVENTION

The present invention relates to a method for simulating deviations in surface appearance of plastics parts caused by a forming process of plastics parts according to claim 1, and a respective computer system, computer program and computer program product.

The surface appearance of plastics products is a very important topic in the plastics industry. A major criteria of plastics product quality is the surface appearance. The surface quality of plastics parts is influenced by the surface structure, the forming process parameters and by the polymer material itself. Although a lot of efforts to improve surface appearance are done, the results are not always satisfying. The so called tigerstripes phenomenon of the surface appearance has been object of the scientific world for many years.

The plastics part consists of a polymer material of specific geometric design and may comprise thermoplasts and/or thermosetting plastics comprising duroplastics and elastomeric polymer materials. Plastics parts are produced by a forming process.

The forming process is a process where the polymer raw material is formed to specific plastics parts under expenditure of forming energy. In most of the cases the polymer raw material has the form of pellets. Different forming processes are common in the plastics industry: e.g. injection molding including special types of injection molding processes: like gas assisted injection molding, co-injection molding, backside molding, compression molding and any combination of injection molding and compression molding, polymer extrusion, blow molding and foaming.

A plastics particle or polymer particle is defined as a volume portion of the plastics part. The sum over volume of all plastics particles of a plastics part coincides with the volume of the plastics part.

The surface of a plastics part is defined as the total face (surface) of the plastics part in any details. Due to the fact that plastics parts are generally thin, the ratio between plastics part face to plastics part volume is quite high. This fact also emphasises the importance of the surface quality of plastics parts.

The surface appearance of plastics parts is a very important issue of quality in the plastics industry. The surface appearance is determined on one hand by physical material properties and by inherent properties of the polymer and polymer morphology of very small sized dimension such as color pigments, crystallinity, constituents, kind of molecules. On the other hand the surface appearance is determined by the surface structure of the plastics part, which is the negative copy of the cavity surface of the tool, where the plastic melt is injected. Grain and roughness of the cavity surface are the main structure parameters in terms of surface quality of the plastics parts. It is evident that parameters of the forming process influence the surface appearance of plastics parts.

The surface layer defines a thin layer of polymer material, which influences the surface appearance of the part. Different surface appearance effects are determined by different physical constitutions and therefore the thickness of the surface layer may vary with the effect examined. It is defined, that the volume particles positioned exactly on the surface of the plastics part are part of the surface layer, but polymer particles beneath may also be part of the surface layer.

The "tigerstripes" phenomenon is a common problem in the plastics industry and describes a specific surface defect. Tigerstripes, as known in the plastics industry, describe a visible periodic inhomogenity in surface gloss. Mostly these are alternating dull (or rough) and glossy (or smooth) areas on the surface of injection molded or extruded plastics parts, which surface should be glossy (or smooth) all over.

The thermoplastic polymer may consist of polyolefins, such as polyethylene (PE) and polypropylene (PP), but also of polyamides (PA), polycarbonates (PC), acrylonitrile-butadiene-styrene (ABS), polymethyl methacrylate (PMMA) or polyetherimide (PEI) and compounds and blends of thermoplastic polymers. Compounds are polymers or blends of polymers with every kind of constituents like talc, minerals, glass, rubber and pigments. In addition polymer compounds are equipped with additivation packages.

The simulation of the forming process is common in the plastics industry and is based on the continuum mechanics combined with the method of Finite Elements and/or Finite differences. Finite difference computer based solving algorithms (software) to simulate the forming process are available on the market, such as software of Moldflow Corporation, see e.g. EP 1 218 163 B1. The content of EP 1 218 163 B1 is herewith incorporated as disclosure of the invention of this patent application.

EP 1 218 163 B1 discloses a method of modelling the injection of a fluid (plastic melt) into a mold three-dimensionally. The basis for such a model are the equations for the conservation of mass, momentum and energy and can be expressed in the form shown in equations (3) to (6) in EP 1 218 163 B1 or in the form of the e.g. Navier-Stokes equations (see also page 9, lines 31-32 of EP 1 218 163 B1):

$$\frac{\partial p}{\partial t} + \nabla \cdot (\rho u) = 0$$

$$\frac{\partial u}{\partial t} + (u \cdot \nabla)u = -\frac{1}{\rho}\nabla p - \nabla \phi + \frac{\mu}{\rho}\nabla^2 u,$$

$$\rho\left(\frac{\partial \varepsilon}{\partial t} + u \cdot \nabla \varepsilon\right) - \nabla \cdot (K_H \nabla T) + p\nabla \cdot u = 0.$$

whereas
ρ is the density of the fluid,
v is the velocity,
p is the pressure,
Φ is the potential energy per unit mass,
T is temperature,
μ is the coefficient of shear viscosity;
ε is the internal energy per unit mass,
$K_H$ is the thermal conductivity.

Since the conservation of energy is included in the model, thermal effects can be taken into account during the forming process, and thus for example the thermal effects of phase changes from liquid to solid state can be considered accordingly. In EP 1 218 163 B1 it is said that the following heat transfer mechanisms can be modelled: convection (from the incoming melt), conduction (out of the mold wall), and viscous dissipation (which is related to the thermal energy produced by shearing within the flowing plastic material). Also other mechanisms, such as compressive heating effects (due to heat generated by compression) and cooling effects form decompression (see p. 4, lines 8-11) are to be considered.

The above cited equations describing the flow of the liquid thermoplastic material are solved by a discrete numerical procedure, such as a Finite Element Method, or any other suitable method, see e.g. page 8, line 14-16 of EP 1 218 163

B1. Using the Finite Element Method, the mold cavity volume is divided into single finite elements (finite volumes) and the field variables (such as pressure, temperature, velocity) and the material properties (such as viscosity) are computed iteratively for a node point of a finite element and then interpolated within the element volume.

However, EP 1 218 163 B1 is silent with respect to detecting and predicting surface defects of the plastics part.

SUMMARY OF THE INVENTION

The object of the present invention is to provide a method to predict the occurrence of surface defects by simulating the forming process of plastics parts. The given invention will support engineers by predicting the surface quality of plastic parts, solving the equations of continuum mechanics of the forming process by computer iterations like the Finite Element Method.

The mechanism of forming surface defects such as tiger-stripes is object of this investigation. Up to now to the knowledge of the inventors no similar theory has been published that allows computation of surface defects.

The inventors of the present invention found out, that, if the forming process simulation results show certain plastics particles undergoing a specific critical energy state and becoming part of the surface layer afterwards, the computed positions of the surface defects (deviations in surface appearance) coincide with surface defect positions measured on the plastics part produced.

During the forming process energy is transmitted to each plastics particle through the plastics particle boundaries (face of the specific plastics particle volume). The energy state of a plastics particle at a certain process time is a result of the energy transmitted through the particle volume boundary.

It is given by nature that the polymer material reacts on a specific energy state in a specific physical constitution. Depending on the polymer and on the amount and kind of loading energy many different reactions of the plastics particles can take place. For instance, if a specific plastics particle is loaded with thermal energy higher than its own thermal energy, an increase of the plastics particle temperature will occur. If a specific plastics particle is loaded by shear stresses, the polymer will react to this loading by inherent polymer chain deformation, which in consequence will also cause an inherent heating of the specific particle by internal friction. The conservation of energy within the system (external loading and inherent reaction) is given at any time.

For example when looking at the injection molding process, the temperature of each plastics particle in the melt (cushion) prior to filling the cavity is 240° C. At this process time each plastics particle will have the same energy state. By applying mechanical energy via the screw displacement during the filing phase, the plastics particles are forced to flow through the gating system into the tool cavity. Due to the nature of shear flow the applied shear stresses vary over the wall thickness. Therefore plastics particles flowing on different layers in the cross section of the wall thickness (laminar shear flow) are exposed to different shear stresses and different energies. With increasing distance from the cavity surface the cooling effect is decreasing, but internal heating due to the shear stresses causes a temperature increase of the plastics particles. Plastics particles close or in contact with the solid cooled cavity surface suffer a decrease in temperature or even solidify.

DETAILED DESCRIPTION OF THE INVENTION

Figure 1:
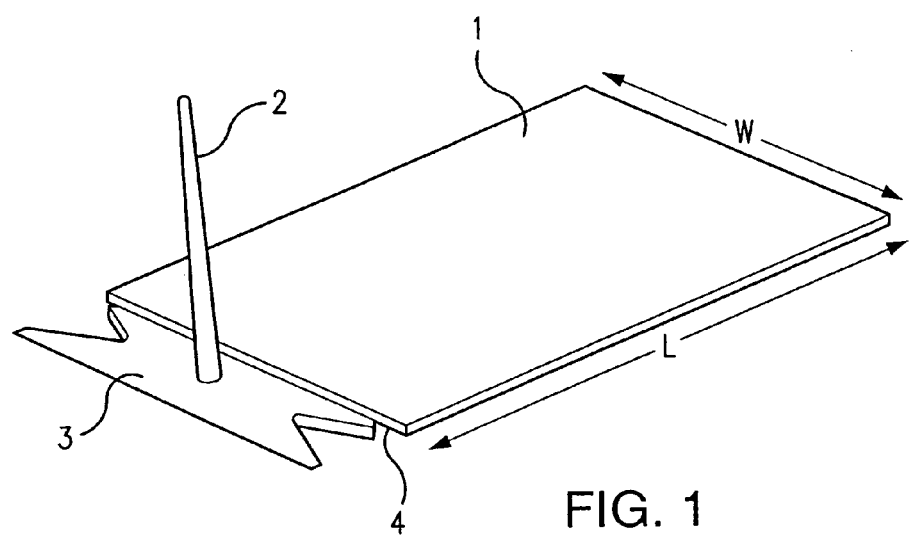
FIG. 1 shows a schematic representation of a plastics part produced by injection molding.

The cooling performance of the forming process cools the polymer melt, so that some plastics particles can get solidified, while others are still in the liquid phase. During the forming process solidified plastics particles can suffer a second phase change from solid to liquid. One solution according to the invention is to trace these particles by simulation on their way to the surface of the part. In consequence, particles of the surface layer with different history (different number of phase changes) will cause a different surface appearance. In addition time, position and velocity of phase change of the plastics particles determine their polymer morphology and therefore surface appearance.

Polymer materials are temperature sensitive. Most of the forming processes of thermoplastics materials take place in the liquid phase, but the temperature of the polymer is lower than a specific critical temperature, where a certain probability of polymer chain cracking is given. Internal heating caused by shear may lead to a dramatic temperature increase of plastics particles. So another solution according to the invention is to trace all plastics particles by simulation which exceed the specific critical temperature, on their way to the surface of the part. In consequence, particles of the surface layer, which exceeded the critical temperature during flow history can cause a different surface appearance.

Colored polymer compounds contain temperature sensitive color pigments. The color of the pigments can change, if a certain critical temperature is exceeded. So another solution according to the invention is to trace all plastics particles by simulation, which exceed the specific critical temperature, on their way to the surface of the part. In consequence, particles of the surface layer, which exceeded the critical temperature during flow history can cause a different surface appearance (color).

Polymer materials are shear stress sensitive. If the shear stress applied to plastics particles exceeds a certain limit, polymer chains will be drawn and highly oriented. This orientation can lead to a different polymer morphology or even to different crystallisation. So another solution according to the invention is to trace all plastics particles by simulation, which exceed a specific critical shear stress or specific critical shear energy, on their way to the surface of the part. In consequence, particles of the surface layer, which exceeded the critical shear stress or shear energy during flow history can cause a different surface appearance. Many polymer compounds contain constituents (fillers) with different density compared to the polymer. Due to the fact of different density of the polymer and constituents, the applied forces during the forming process will lead to different accelerations and deceleration of polymer and constituents. Partial demixing of the compound is the result of this physical process. So another solution according to the invention is to trace all plastics particles by simulation, which exceed a specific critical acceleration or deceleration, on their way to the surface of the part. In consequence, particles of the surface layer, which exceeded critical acceleration or deceleration during flow history can cause a different surface appearance. As stated before plastics particles are exposed to different kinds of energies during the forming process, such as temperature, shear stresses, shear energies, acceleration forces and other physical fields. So another solution according to the invention is to trace all plastics particles by simulation, which exceed combinations of the discussed physical fields, on their way to the surface of the part. Plastics particles, of the surface layer, which exceeded a defined limit of combined critical physical fields, will most probably cause different surface appearance of the plastics part.

Above defined critical values such as temperature, shear stress, acceleration and combinations of different physical fields could also be functions of time, pressure and all other physical parameters involved.

Above defined critical values such as temperature, shear stress, acceleration and combinations of different physical fields do not need to be discrete values, but can also be defined as ranges of values.

Figure 5:
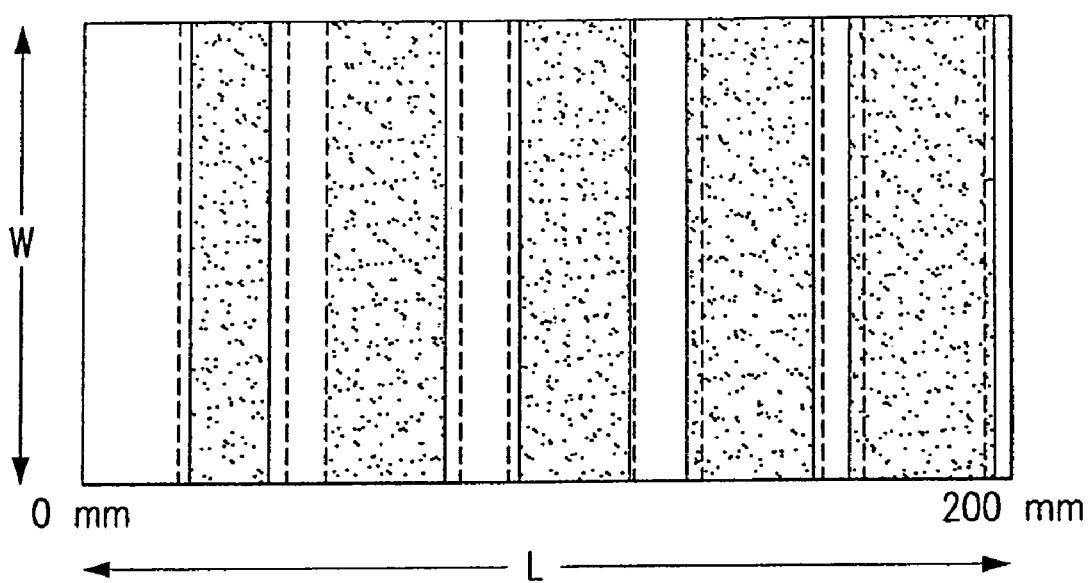
FIG. 5 shows a diagram of simulated (computed) surface appearance defects versus measured surface appearance of the plastics part.

After defining the position of particles in the surface layer as a position with deviations in the surface appearance, one possible embodiment of the invention is the visualization of the final position of those particles in the surface layer of the plastics part, e.g. graphically. For example, areas with a surface defect can be drawn into a picture of the plastics part, as shown in FIG. 5.

The invention can be implemented as a computer program.

Example

The following description refers mainly to injection molding of polyolefins, but the present invention is not restricted to injection molding or polyolefins.

In industrial reality of the injection molding process the mold cavity (tool) is cooled permanently to solidify the liquid polymer melt. Plastics particles undergo a phase change from liquid to solid. Due to the ongoing filling of the cavity, local temperature increases may happen. This temperature increase may lead to a second phase change of certain particles from solid to liquid. Process time and position of these particles are marked in the simulation. Thus plastics particles can reach the surface layer. In simulation the final positions of these particles are computed. The final positions of these particles being part of the surface layer indicate positions of different surface appearance.

FIG. 1 shows the representation of a plastics part 1 produced by a common injection molding process. The dimensions of the plastics part are 200 mm in length (L), 150 mm in width (W) and a wall thickness of 3 mm. During filling the cavity the melt flows through the cold runner 2 (light grey color), which has a circular cross section with a diameter between 3 mm and 6 mm and a length of 95 mm. The distributor 3, (dark grey) has a constant wall thickness of 5 mm. The film gate 4 (black) is designed with a wall thickness of 0.6 mm. For reasons of simplicity a specific part with the specific gating system has been depicted, but of course the invention is also applicable to any other cavity (geometry) with any other gating system. The computer simulation of the injection molding process is performed with the Software Moldflow Plastics Inside Release 5. The process parameter chosen for the simulation are defined in Table 1:

TABLE 1

| Process Parameter of the Simulation | | |
| --- | --- | --- |
| Melt Temperature | ° C. | 240 |
| Mold Surface Temperature | ° C. | 40 |
| Filling Time | sec | 0.5 |

Figure 2:
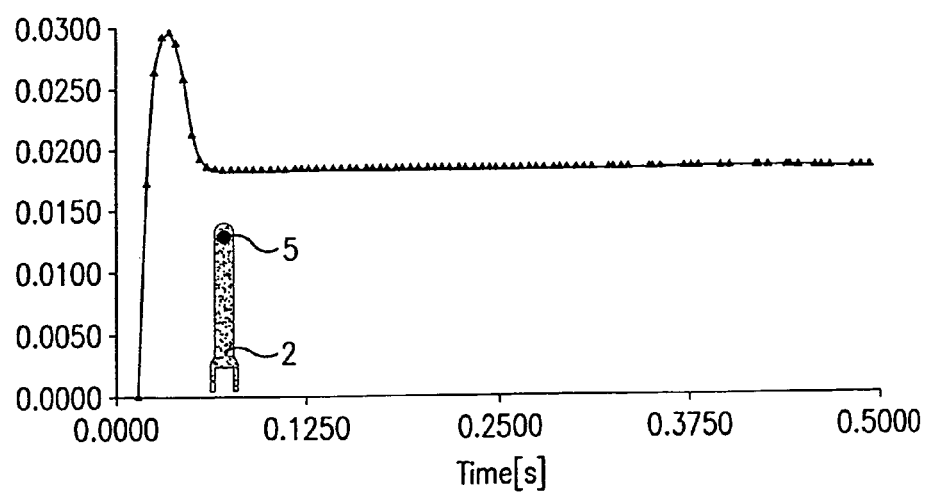
FIG. 2 shows a computed frozen layer fraction of a specific cross section during the filling phase as function of time.

FIG. 2 shows a computed result of frozen layer fraction at a specific position. The frozen layer fraction is the thickness of the solidified layer as a fraction of the total thickness at the marked cross section 5. The marked cross section is at approximately half the height of the cold runner 2. The filling phase of the injection molding process takes approximately 0.5 seconds. As it can be seen, the frozen layer fraction of the chosen cross section keeps constant over a wide time range of about 2%. From the time the melt passes the specific marked cross section area, the frozen layer fraction increases rapidly to approximately 3%. At this process time (0.05 seconds) 3% of the cross section is in the solid phase and the rest, approximately 97%, is in the liquid melt phase. After approximately another 0.05 seconds of process time a decrease of frozen layer fraction from 3% to 2% indicates a second phase change of plastics particles from solid to liquid. These process time and position of particles are marked for further tracking in simulation.

Figure 3:
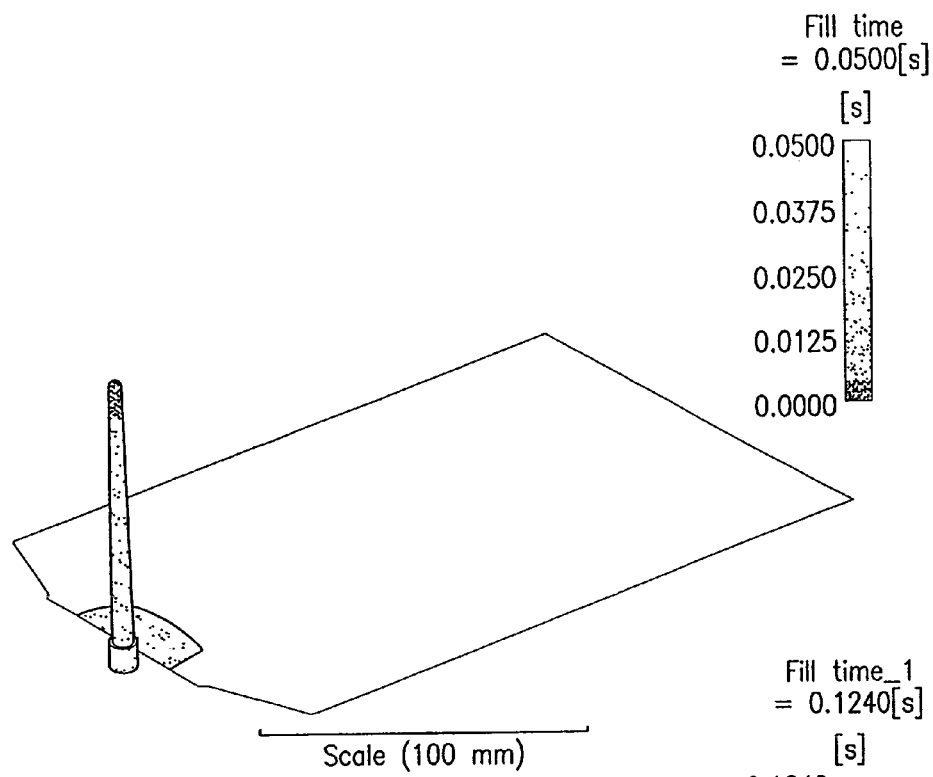
FIG. 3 shows the computed filling status of the cavity at the process time, when the decrease of frozen layer fraction starts in FIG. 2.

FIG. 3 shows the computed filling status of the cavity at the process time, when the decrease of frozen layer fraction starts at the position shown in FIG. 2. At this time (0.05 seconds) only a very small portion of the cavity is filled. The plastics particles marked can reach the surface layer in a further filling step and these final positions will indicate different surface appearance.

Figure 4:
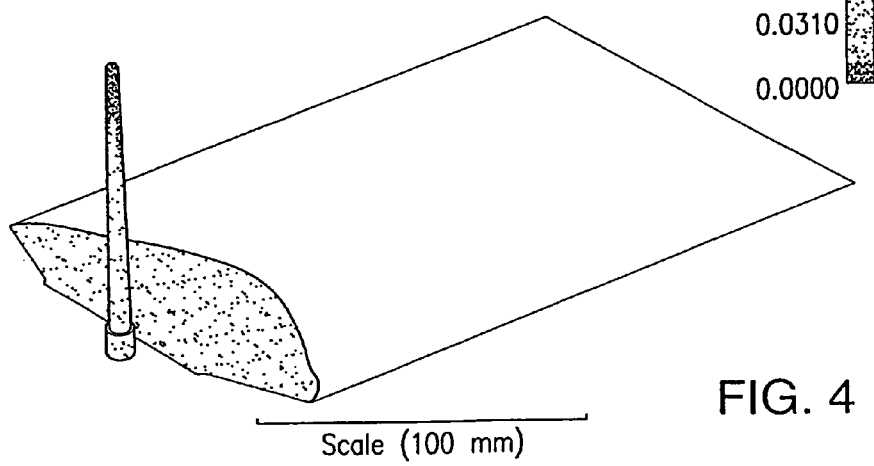
FIG. 4 shows the computed filling status of the cavity, when the plastics particles marked in FIG. 2 reach the surface layer.

FIG. 4 shows the computed filling status of the cavity, when the plastics particles marked in FIG. 2 reach the surface layer. The shown flow front indicates the positions, where the marked particles reach the surface layer. These positions coincide with the position of different surface appearance.

FIG. 5 shows the measured and simulated positions of different surface appearance of the plastics part produced and simulated. The surface defect shown is called tigerstripes phenomenon. The surface gloss is measured by a gloss measuring device and the measured positions (areas) of reduced surface gloss are indicated in grey. The simulated positions (areas) of plastics particles according to FIG. 4 are enclosed by a dotted line. As it can be seen the computed positions of surface defects correlate very good with the positions measured.

Polymer Material Parameter:

The computer simulation of the injection molding process requires the definition of the thermal properties of the material grade.

Figure 6:
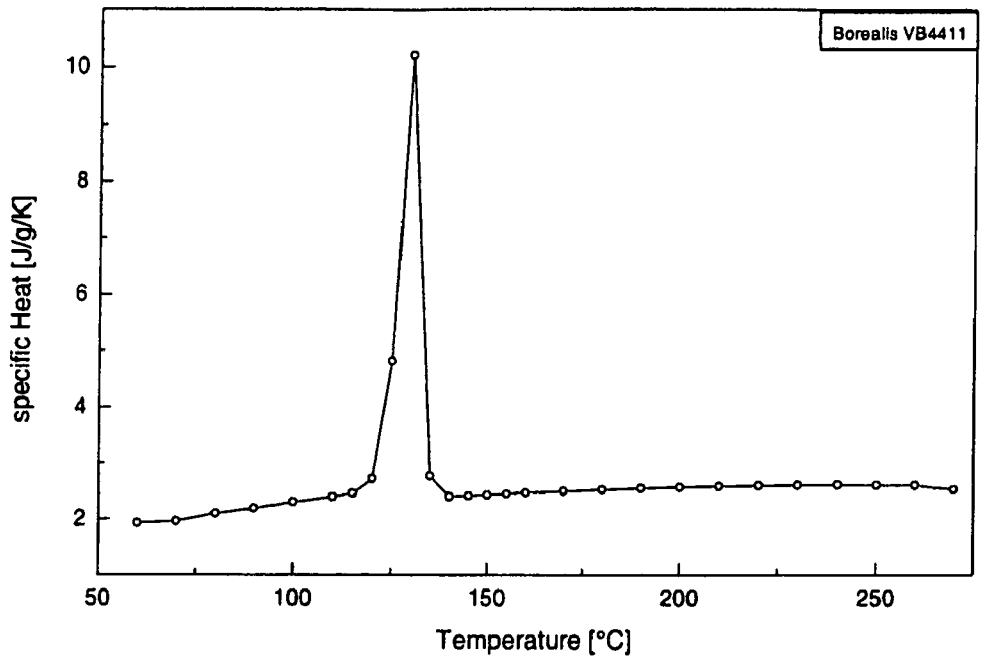
FIG. 6 shows the specific heat of a specific plastic grade as a function of temperature.
Figure 7:
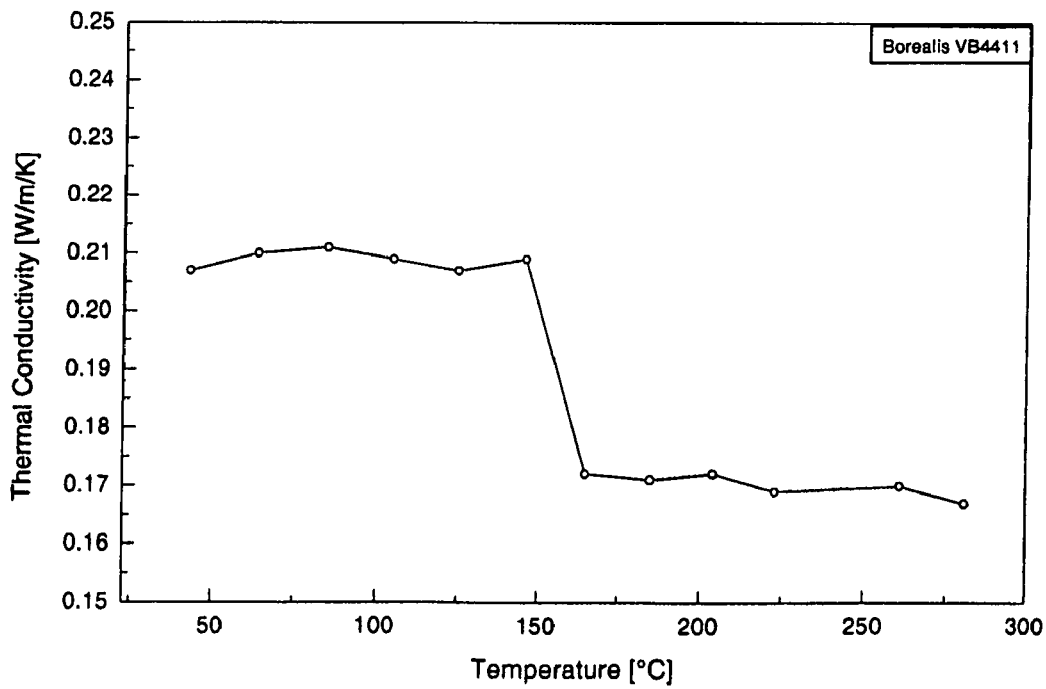
FIG. 7 shows the thermal conductivity of a specific plastic grade as a function of temperature.
Figure 8:
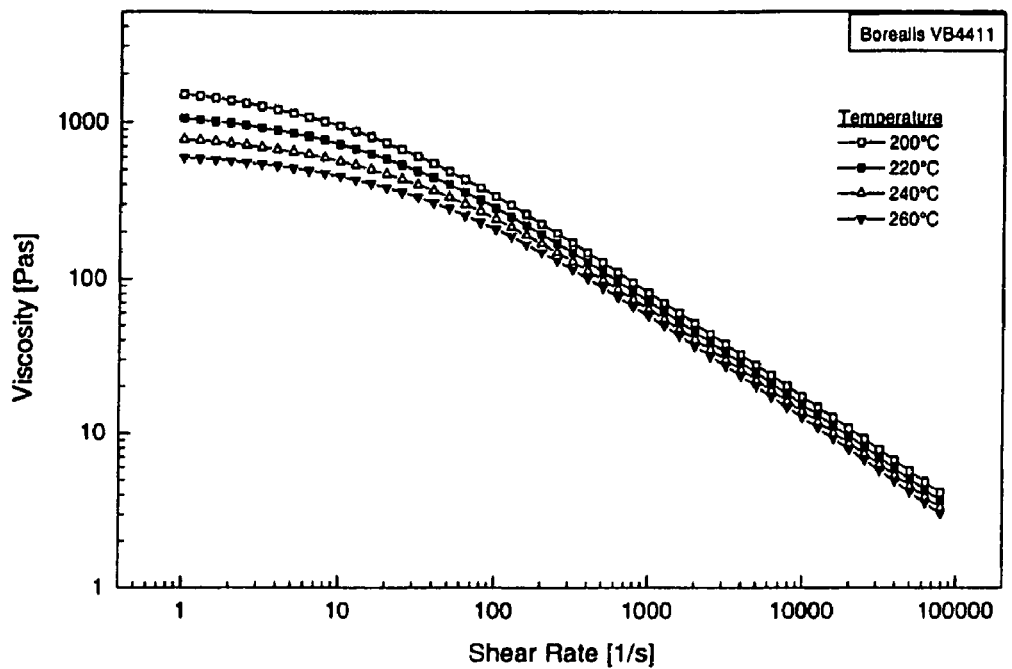
FIG. 8 shows the viscosity of a specific plastic grade as a function of shear rate for different melt temperatures.
Figure 9:
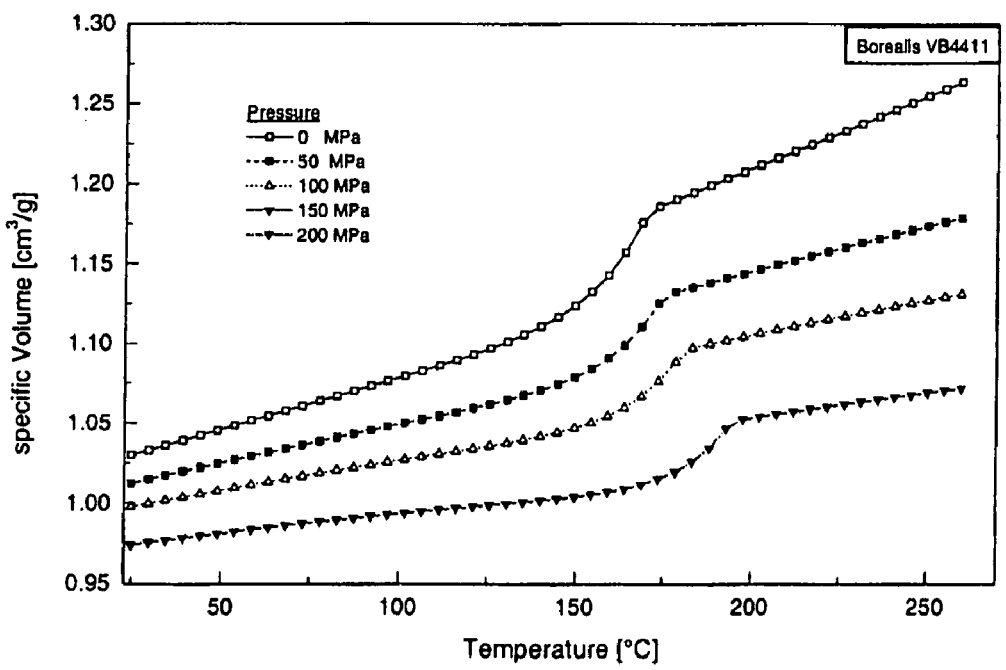
FIG. 9 shows the specific volume of a specific plastic grade as a function of temperature for different pressures.

The simulation of this example is performed with the Borealis grade VB4411, which is a 10% mineral and elastomer modified polypropylen compound intended for injection molding process. The grade is widely used in automotive business for bumper facias and exterior trims. The specific heat and the thermal conductivity of VB4411 are shown in FIG. 6 and FIG. 7. In simulations, viscosity and specific volume of VB4411 are required. FIG. 8 shows measured viscosity curves of VB4411 as a function of shear rate for different melt temperatures. FIG. 9 represents the specific volume of VB4411 as a function of temperature for different pressures.

The invention claimed is:

1. Method for simulating deviations in surface appearance of a plastics part caused by a forming process, comprising:
   a) simulating the forming process of the plastics part,
   b) detecting, during the simulation, a position and time of plastics particles of plastics part, in which plastics particles first exceed at least one defined critical limit,
   c) computing final position for surface-layer plastics particles by tracing in simulation all plastics particles, which exceeded the defined critical limit, on their way to the plastics part's surface, and
   d) defining final position for each of the traced surface-layer plastics particles as a position with deviations in the surface appearance among plastics particles formed into the plastics part.

2. Method according to claim 1, wherein the defined critical limit is a predetermined temperature.

3. Method according to claim 1, wherein the defined critical limit is a predetermined shear rate.

4. Method according to claim 1, the defined critical limit is a predetermined acceleration or deceleration.

5. Method according to any of claims 1 to 4, wherein the defined critical limit is a range of values.

6. Method according to any of claims 1 to 4, wherein the critical limit is a combination of at least two physical field functions.

7. Method according to any of claims 1 to 4, wherein the critical limit is a function of time, pressure and/or other physical parameter of the forming process.

8. Method according to claim 1, comprising another step which comprises e) visualization of the final position of those particles in the surface layer of the plastics part.

9. Method according to one of claims 1 to 4, wherein the forming process is one of the following: injection molding, gas assisted injection molding, compression molding, compression injection molding, co-injection molding, backside molding, blow molding.

10. A computer program, embodied on a computer readable storage medium, configured to cause a computer, when the program is read from the storage medium and executed by the computer, to perform the method according to any of claims 1 to 4.

11. A computer system comprising a computer readable storage medium and a processor, the computer readable storage medium storing the computer program of claim 10, the processor executing program instructions of said computer program when read from the computer readable storage medium.

12. Method according to claim 6, wherein the physical field functions comprise temperature, shear rate, acceleration and/or deceleration.

13. A computer readable storage medium on which is embodied the computer program of claim 10.

14. Method for simulating deviations in surface appearance of a plastics part caused by a forming process, comprising:
   simulating the forming process of the plastics part;
   detecting, during the simulation, a position and time of plastics particles of the plastics part for each one of plastics particle that is found to first exceed at least one defined critical limit;
   for said each one of found plastics particle, tracing simulated position of said each one of found plastics particle from the time it first exceeded the at least one critical limit; and
   for each one of traced plastics particle that has a final position simulated as being at the surface of the plastics part, identifying said final position as being at a position on the plastic part that corresponds to a simulated deviation in surface appearance on the plastics part that is predicted to occur during the forming process, wherein said traced plastics particle are among the plastics particles that are being formed into the plastics part.

* * * * *